April 4, 1933.  J. C. CROWLEY  1,903,395

VALVE STEM

Filed May 31, 1929

Inventor
John C. Crowley
Knox Hudson & Kent
attys.

Patented Apr. 4, 1933

1,903,395

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

VALVE STEM

Application filed May 31, 1929. Serial No. 367,313.

This invention relates to a valve stem construction and more particularly to a two-piece valve stem construction whereby a valve stem of other than the usual standard construction of valve stem may be equipped to use a standard valve insides.

An object of the invention is to provide a two-piece valve stem which is so constructed that pneumatic tire tubes equipped with such stems may be interchangeably used on different types of wheels.

Another object is to provide a two-piece valve stem whereby the tire tube equipped with such stem can be used on wheels such as disk or other type wheels, where it is necessary to have the portion of the stem containing the valve insides extending toward and located adjacent to the rim flange of the wheel.

Another object is to provide a two-piece valve stem whereby the two stem parts are prevented from rotating relatively to each other but are permitted to be moved relatively longitudinally for the purposes of assembly and adjustment.

Another object is to provide a two-piece valve stem construction wherein separate means for clamping one of the stem parts in the tire tube and for holding the two stem parts together are provided, whereby one of the stem parts may be adjusted relatively to the other independently of the clamping relationship between such other part and the tire tube.

Another object is to provide a two-piece valve stem construction formed of relatively few parts which are easily assembled and economically manufactured.

Additional objects and advantages will appear hereinafter as the description of two embodiments of the invention proceeds, such embodiments being illustrated in the accompanying drawing wherein Fig. 1 is a side elevational view of the two piece valve stem, one of the valve stem parts and a portion of the other part being shown in section.

Figures 1, 2:
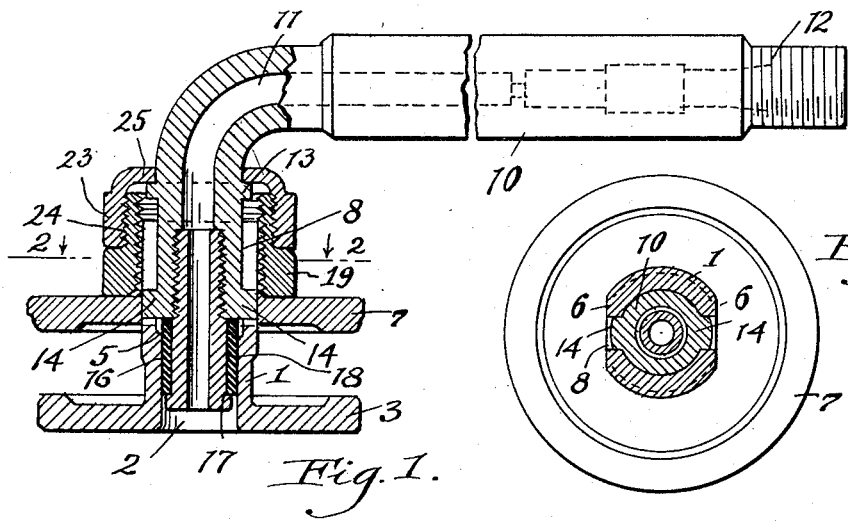
Fig. 2 is a horizontal sectional view through the two piece valve stem shown in Fig. 1, such view being taken substantially on line 2—2 of Fig. 1 looking in the direction of the arrows, the nut for clamping the stem in the tire tube being omitted in this view.

As is well known, the present conventional type of valve stem is made usually of a tubular piece of brass or other non-corroding metal and has an externally threaded portion at one end provided with an end part of reduced diameter. The valve stem is formed with a tapered shoulder adjacent its outer end and arranged in the central bore through the stem, which shoulder is adapted to receive a portion of a standard valve insides. These valve stems are made of brass or other similar metal in order to permit of easy insertion or removal of the valve insides and to prevent the insides becoming frozen within the stem after they have been inserted therein for a long period of time and subjected to weather conditions.

One part of the valve stem disclosed herein will be described as made of steel or other suitable metal, while another part thereof will be described as formed of a non-corroding metal, such as brass.

There are certain types of wheels which require that the portion of the valve stem containing the valve insides be located adjacent the rim flange of the wheel. This has necessitated the use of different stems upon tire tubes which are to be used with such wheels, as heavy disk wheels, than are used upon the ordinary spoke type wheel. The present invention discloses a two piece valve stem which may be used upon tire tubes irrespective of the type of wheels with which the tubes are to be used and in which the parts may be so associated as to take care of the different conditions arising in connection with the different types of wheels.

The two piece valve stem comprises a stem part 1 which is a tubular member provided with an internal bore 2 and having adjacent one of its ends a head 3 which is adapted to cooperate with a spreader plate (later to be described) for clamping portions of an inner tube between the head and the spreader plate. The end of the stem part opposite to the head 3 is externally threaded at 4, while the bore 2 adjacent such end is enlarged and is connected to the small or lower portion of the bore by a tapered shoulder 5. The stem part 1 is provided on its exterior surface with one or more flats 6 so that when a spreader plate 7 is arranged on the stem part such spreader plate, which has a central opening provided with flat sides cooperating with the flats 6, will be held against rotation relative to the stem part.

Figures 3, 5:
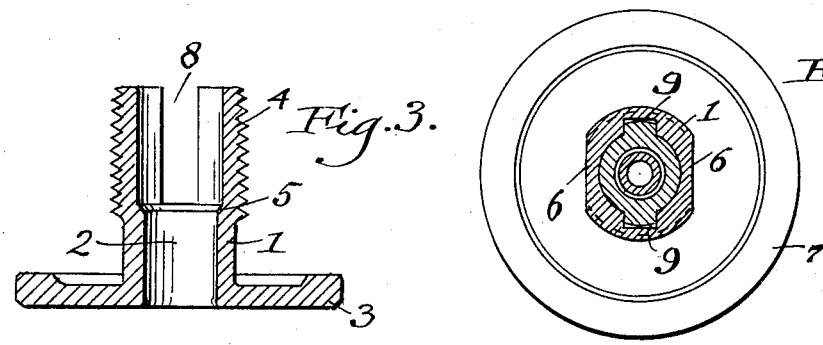
Fig. 3 is a vertical transverse section through one of the valve stem parts shown in Fig. 1.
Fig. 5 is a horizontal sectional view similar to Fig. 2, the valve stem parts shown in this latter view, however, being of the form illustrated in Fig. 4.
Figures 4, 7:
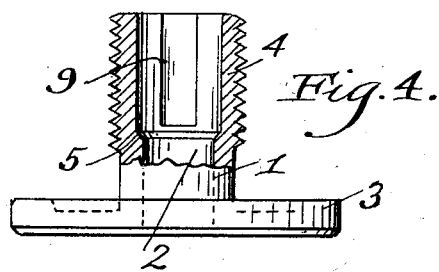
Fig. 4 is a partial vertical transverse section through a slightly modified form of one of the valve stem parts.
Fig. 7 is another detail view, certain portions thereof being shown in section.
Figure 6:
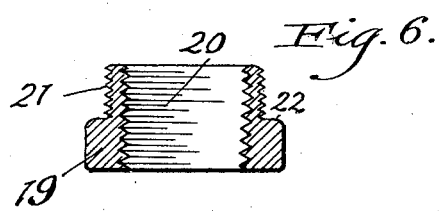
Fig. 6 is a detail transverse vertical section.

In the form shown in Figs. 1, 2 and 3 the stem part 1 is provided with a pair of diametrically opposite slots 8 extending from the upper edge of the stem part to a point adjacent the tapered shoulder 5, while in the form of stem part shown in Figs. 4 and 5 the stem part 1 is provided with a pair of diametrically opposite keyways or grooves 9 likewise extending from the upper end of the stem part to a point adjacent the shoulder 5. However, in all other respects the two forms of stem parts shown herein are substantially alike.

It is of course understood that when the part 1 is clamped by means of the head 3 and the spreader plate to a tire tube and the tube is arranged in a tire casing and the casing and tube mounted upon a rim, that the part 1 extends through the usual opening in the rim, it being noted however that the part 1 is relatively short as compared to the stem part later to be referred to and therefore will extend only a short distance beyond the inner periphery of the rim or wheel. The other stem part 10, which may be either in the form of an elbow or which may be straight is relatively long as compared with the part 1 and is provided with a central bore 11 which, when the parts are assembled, will be in communication with the bore 2 in the stem part 1. A stem part 10 of the elbow form, as will be readily understood, is used for the purpose of arranging that end of the valve stem which contains the valve insides at a point adjacent the rim flange of the wheel, such use being designed, for instance, with reference to wheels of the type used upon trucks or busses. The outer end of the stem part 10 is threaded, as indicated at 12, for the reception of a suitable form of dust cap or closure member, it being understood that the valve insides are arranged in such outer end, such valve insides being screwed into the interiorly threaded portion of the bore of the stem as is usual in the conventional valve stem construction. The other end of the part 10 includes a straight portion having an annular outwardly extending rib 13 arranged inwardly of the end of the part, while at the end thereof it is provided with diametrically opposite outwardly extending lugs 14, which lugs, when the part 10 is assembled in the part 1, fit in the slots 8 or in the grooves 9, as the case may be, and holds the part 10 against rotation relative to the part 1. The end of the part 10 adjacent to the lugs 14 is provided with a counterbore in axial alignment with the bore 11, which counterbore is threaded to cooperate with the threads 15 upon one end of a tubular member 16 which has an annular shoulder or head 17 at its other end. A packing gasket 18 is arranged on the tubular member 16 so as to be held thereon by the shoulder or head 17, and when the member 16 is screwed into the lower end of the part 10 the packing gasket 18, which is of slightly greater diameter than the bore 2 of the part 1 is compressed between the shoulder 20, the end of the part 10 and the wall of the bore 2, to provide an air-tight connection between the two stem parts.

A nut 19 internally threaded at 20 and externally threaded at 21 is used for clamping the stem part 1 to the tire tube, the internal threads 20 of such nut cooperating with the threads 4 of the valve stem part 1, with the result that when the nut 19 is screwed down upon the stem part 1 it will force the spreader plate 7 into clamping engagement with the head 3 to clamp the stem part 1 and the tire tube in assembled relationship. The nut 19 is also provided with an outwardly extending annular shoulder 22 on its outer surface, which shoulder forms the seat or abutment for the lower end of an assembly nut 23 when the latter nut has been finally positioned upon the parts. This nut is internally threaded at 24, such threads cooperating with the threads 21 of the nut 19, while at its upper end it is provided with an inwardly extending annular flange 25 adapted to engage over the rib 13 of the stem part 10, with the result that such flange will maintain the part 10 in assembled position with respect to the valve stem part 1 and at the same time will permit the nut 23 to be rotated for the purpose of adjustment. It will be seen that the exteriorly threaded portion 21 of the nut 20 when the nut 20 is screwed down upon the stem part 1, will extend into and through the usual opening in the tire rim and thus be in a position to receive the nut 23.

When the stem part 10 is to be assembled in the valve stem part 1 the end of the part 10 is inserted in the enlarged portion of the bore 2 with the lugs 14 thereof engaging in the slots or keyways, as the case may be, in the valve stem part 1. The nut 23 is then screwed down upon the external threads of the nut 19, and since the connection between the nut 23 and the part 10 is a swivel connection, the movement of the nut 23 will force the part 10 into the bore of the stem part 1 until the packing gasket 18 has been compressed, as previously mentioned. When the nut 23 has been completely positioned the lower end thereof will bear upon the shoulder 22 of the nut 19. Should the nut 23 work loose during use, it is only necessary to tighten the same to secure the proper assembled relationship of the parts since the two piece valve stem is clamped to the tire tube with an independent connection. The valve stem part 1, the spreader and the nuts 19 and 23 may be made of steel or any other suitable low cost corrosive metal while the part 10 should be made of a suitable non-corroding metal, the purpose of such an arrangement being clearly understood.

The invention is susceptible of such modifications and adaptations as fall within the scope of the appended claims.

Having thus described my invention, I claim:

1. A two piece valve stem construction comprising, in combination, an exteriorly threaded stem part provided with a longitudinal bore and having a head at one end adapted to be arranged within a tire tube, a nut arranged on said stem part and adapted to hold a spreader plate in clamping relation with the said head and having an exteriorly threaded portion adapted to extend into the usual opening in the tire rim, a second stem part adapted to removably receive at its outer end the usual valve insides and having its inner end extending into the bore of the first named stem part, a nut arranged on the exteriorly threaded portion of said first named nut, and cooperating means on said second named stem part and said second named nut effecting a swivel connection therebetween.

2. A two piece valve stem construction comprising, in combination, an exteriorly threaded stem part provided with a longitudinal bore and having a head at one end adapted to be arranged within a tire tube, a nut on said exteriorly threaded stem part and adapted to hold a spreader plate in clamping relation with the said head and having an exteriorly threaded portion adjacent one end thereof adapted to extend into the usual opening in the tire rim, a second stem part adapted to removably receive at its outer end the usual valve insides and having its inner end extending into the bore of said first named stem part, a laterally extending flange located outwardly of the inner end of said second stem part, and a nut arranged upon the exteriorly threaded portion of said first named nut and having an inturned end cooperating with said flange to provide a swivel connection between said second named nut and said second named stem part.

3. A two piece valve stem construction comprising, in combination, a relatively short exteriorly threaded stem part provided with a longitudinal bore and having a head at one end adapted to be arranged within a tire tube, a nut screwed on said exteriorly threaded stem part and adapted to hold a spreader plate in clamping relation with the said head and having an exteriorly threaded portion adjacent one of its ends adapted to extend into the usual opening in the tire rim, a second and relatively long stem part adapted to removably receive at its outer end the usual valve insides and having its inner end extending into the bore of said first named part, and a nut arranged upon the exteriorly threaded portion of said first named nut, cooperating means on said second named stem part and said second named nut effecting a swivel connection therebetween, and cooperating means on said stem parts to hold the same from relative rotation.

In testimony whereof, I hereunto affix my signature.

JOHN C. CROWLEY.